US009420460B2

(12) United States Patent
Golaup et al.

(10) Patent No.: US 9,420,460 B2
(45) Date of Patent: Aug. 16, 2016

(54) WLAN AUTHENTICATION RESTRICTION

(71) Applicant: Vodafone IP Licensing Limited, Berkshire (GB)

(72) Inventors: Assen Golaup, London (GB); Christopher David Pudney, London (GB)

(73) Assignee: VODAFONE IP LICENSING LIMITED, Newbury, Berkshire (GB)

( * ) Notice: Subject to any disclaimer, the term of this patent is extended or adjusted under 35 U.S.C. 154(b) by 47 days.

(21) Appl. No.: 14/203,962

(22) Filed: Mar. 11, 2014

(65) Prior Publication Data
US 2014/0287717 A1 Sep. 25, 2014

(30) Foreign Application Priority Data

Mar. 19, 2013 (GB) .................................. 1305049.7

(51) Int. Cl.
*H04W 12/06* (2009.01)
*H04W 48/04* (2009.01)
*H04W 48/02* (2009.01)
*H04W 12/08* (2009.01)
H04W 84/12 (2009.01)
H04W 88/06 (2009.01)

(52) U.S. Cl.
CPC .............. *H04W 12/06* (2013.01); *H04W 12/08* (2013.01); *H04W 48/02* (2013.01); *H04W 48/04* (2013.01); *H04W 84/12* (2013.01); *H04W 88/06* (2013.01)

(58) Field of Classification Search
CPC ...... H04L 63/08; H04W 12/06; H04W 12/08; H04W 48/04; H04W 88/06; H04W 12/12; H04W 88/02; H04W 48/02

USPC .............. 455/410, 411, 445, 561, 435.1, 428; 380/247; 726/7
See application file for complete search history.

(56) References Cited

U.S. PATENT DOCUMENTS

| 5,940,755 A * | 8/1999 | Scott .................... H04Q 3/0029 455/406 |
| 6,996,076 B1 * | 2/2006 | Forbes .............. H04L 29/06027 370/310 |
| 2003/0058827 A1 * | 3/2003 | Chow ...................... H04L 12/66 370/338 |
| 2004/0196806 A1 * | 10/2004 | Loeffler et al. ............... 370/329 |

(Continued)

FOREIGN PATENT DOCUMENTS

| CN | 101902790 | 12/2012 |
| WO | WO-2007/093216 | 8/2007 |

OTHER PUBLICATIONS

European Search Report dated Jul. 3, 2014 in corresponding European Patent Application No. 14158509.

(Continued)

*Primary Examiner* — Mahendra Patel
(74) *Attorney, Agent, or Firm* — B. Aaron Schulman, Esq.; Nicholas Trenkle; Stites & Harbison, PLLC.

(57) ABSTRACT

Controlling authentication of a device within a cellular network is provided. The authentication allows the device to access a non-cellular network via an access point and is between the device and an authenticating entity within the cellular network. Information is obtained about a state associated with the device. Based on the obtained information, it is evaluated whether to allow the device to perform authentication with the authenticating entity. This may be done at the device.

14 Claims, 2 Drawing Sheets

(56) References Cited

U.S. PATENT DOCUMENTS

| | | |
|---|---|---|
| 2004/0203862 A1 | 10/2004 | Wood et al. |
| 2007/0091848 A1* | 4/2007 | Karia ............... H04L 29/06027 370/331 |
| 2009/0170557 A1* | 7/2009 | Chauhan ............... H04W 36/14 455/552.1 |
| 2009/0215438 A1* | 8/2009 | Mittal ............... H04M 3/42195 455/418 |
| 2010/0113019 A1* | 5/2010 | Jeong et al. ............... 455/435.2 |
| 2011/0077008 A1 | 3/2011 | Lu et al. |
| 2012/0014316 A1* | 1/2012 | Rahman ............... H04W 40/20 370/328 |
| 2012/0094667 A1 | 4/2012 | Nishida et al. |
| 2013/0143542 A1* | 6/2013 | Kovvali ............... H04W 48/18 455/418 |

OTHER PUBLICATIONS

Alcatel Lucent, "Wi-Fi Roaming—Building 1-7, 9-15 and ANDSF and Hotspot 2.0", Internet Citation, Feb. 27, 2012, pp. 1-45, XP002677915.

GB Search Report for GB1305049.7 dated Aug. 22, 2013.

* cited by examiner

WLAN AUTHENTICATION RESTRICTION

FIELD OF THE INVENTION

The invention concerns control of authentication of a device within a cellular network, the authentication for allowing the device to access a non-cellular network via an authenticator (e.g., an access point).

BACKGROUND

The Wireless Local Area Network (WLAN) ecosystem e.g. Wi-Fi Alliance (WFA) have been developing certifications (e.g. Passpoint™ based on WFA Hot Spot 2.0 specifications) that can automate the mobile device access to WLAN networks using 802.1x port based authentication and hence make the user access experience to WLAN more cellular like. In order to provide security matching that of cellular networks, authentication signalling towards the centralised Authentication, Authorisation and Accounting server (AAA server) in the service provider's core network is required, especially when using cellular network credentials like those in the (U) SIM (Universal Subscriber Identity Module).

However, uncontrolled automatic authentication by smartphones on WLAN access networks can create signalling overload on critical cellular Core network elements, especially the 3GPP AAA server and the subscription databases like Home Location register (HLR). The problem is caused by the 3GPP AAA server receiving too many requests for authentication within a certain time (relative to its dimensioned capacity) and/or the interface between the 3GPP AAA server and a subscription database (HLR) being overloaded with signalling.

This problem has been recognised by the GSM Association (GSMA) and the Wireless Broadband Alliance (WBA) and a task force has been setup to find solutions to this problem. Solutions are required for the following scenarios:
  UE (User Equipment) mobility in dense hotspot scenarios e.g. stadiums
  Wide scale deployment of community Wi-Fi solutions;
  Transport hubs creating sudden surge of authentication when users alight at train stations or airports.

The following solution categories have been considered to reduce and control signalling load on the cellular operator 3GPP AAA server and subscription databases due to WLAN authentication.

1. Control the Behaviour of UE—Reduce Number of Full Authentication Requests to Core Network.

One basic approach is for the operator to define Access Network Discovery and Selection Function (ANDSF) new operator policies (specified in 3GPP TS 24.312) that:
  a) Provide policies about subscription validity to prevent a UE from trying to associate with a WLAN Access Point (AP) when that WLAN network would not be suitable (e.g. because the UE subscription does not allow WLAN access in the given UE location or is not valid for the time of the day).
  b) Allow the operator to control, per type of AP (SSID, OUI, Venue Type, etc. . . . ), the frequency of authentication requests (low, medium, high) or maximum number of authentication requests that a UE may use to try to associate with this AP.
  c) Allow the operator to define policy for a UE to authenticate/not authenticate to a certain AP type depending on its mobility state. The connection manager may use proprietary solutions to estimate the UE speed and map to the mobility state defined in the operator policy (mobility state definitions in terms of UE speed could be specified). Examples of policies could be:
    for a 'High' mobility state UE to not associate to a certain type of AP e.g. 'shopping mall APs' but allowed to associate to 'Transport based' APs e.g. APs on trains.
    for a UE with 'high' mobility state to wait for a certain time period to associate on the AP (e.g. prevents UE in car associating to AP at traffic light).
  d) Allow an operator to define policy based on UE knowledge of previously connected AP type and detected AP type e.g. randomly delay access to an AP of type 'station' over a time period (defined in the policy) if the previously connected AP type was 'transport based' e.g. to spread signalling load and avoid signalling peaks at train stations.
  e) Allow operator to define policy that limits or prevents authentication requests from a device where the received signal strength of the target AP is below a certain threshold e.g. to prevent UE authenticating at the edge of an AP and then immediately moving out to a different AP, especially if the UE is 'ping-ponging' between the APs.

A drawback of this solution is that the ANDSF policies are static do not respond to dynamic changes in AAA server load.

2. Control UE Behaviour when Authentication Requests Either Fail or are Rejected.

Define appropriate error codes (and scope and time duration) that are interpreted by the UE to:
  a. Stop retrying an access attempt to the same WLAN access during a delay set by the network (e.g. when the rejection corresponds to a temporary network overload), or
  b. Stop retrying an access attempt to any AP of the same WLAN access indefinitely when the rejection is due to a permanent error (e.g. no subscription to the service on this WLAN access), and/or A drawback of this solution is that it only limits the signalling due to re-authentication.

3. Use Key Caching for Deployments Where a WLAN Controller is Deployed.
  a. In its most basic form it involves caching the Pairwise Master Key (PMK) in each AP so that it can be re-used if the UE returns to the same AP. However, it can also be used in a form whereby the UE can pre-authenticate in its current AP in order to prepare new PMKs for visiting neighbouring APs under the same WLAN access controller. This pre-authentication is done locally by the WLAN controller and does not increase load on the AAA.
  b. There are also more sophisticated techniques where a single PMK (pairwise master key) or PTK (pairwise transient key) can be used across multiple APs. Examples of these approaches include Cisco's proprietary CCKM technique, and Proactive Key Caching (PKC) (also called Opportunistic Key Caching, OKC) which was introduced in 802.11i. These are more efficient than PMK caching but have the disadvantage that they are not as widely supported on clients.
  c. 802.11r is a more efficient form of PKC/OKC which aims to deliver AP transition times on a par with the proprietary CCKM solution.

These solutions are effective for scenarios where a WLAN controller is present for the PMK caching and surrounding APs which UE can visit can be prepared for them to allow the UE access without authentication. However, these solutions are ineffective for scenarios like community Wi-Fi.

4. Fast Re-Authentication Techniques to Limit Signalling Traffic Sent to Core Network Nodes.

These are enabled by the Authentication Server providing Fast Re-Authentication Identity and other parameters to the Wireless Protected Access (WPA) supplicant instantiated on the end-user device, as part of normal Full Authentication procedure. When the WPA supplicant requires authentication subsequent to a given Full Authentication, it can optionally use a Fast Re-authentication procedure. The signalling load generated by the fast Re-authentication procedure is less than that required for a full authentication.

This solution does not prevent or limit the generation of unnecessary authentication attempts and is only useful if each UE has to perform frequent authentication.

5. Only Authenticate when Traffic Needs to be Passed

The basic approach is for the device operating system to define logic that gauges whether any applications are ready to consume data or are entitled to consume data.

This solution relies on an accurate estimate of the data activity of the UE.

6. Control Behaviour of AAA Server
   a. Rate limit number of authentication requests
   b. Limit number of authentication requests a AAA server can send to other AAA servers and/or towards an HLR/HSS Such an approach does not distinguish between unnecessary authentication requests and authentication requests that are meaningful. Thus, it might end up penalising users who really need to access WLAN at the benefit of users who do not need access at the time but UE is just making automatic and unnecessary authentication.

Accordingly, there is a need for a solution that controls in an effective and simple manner the authentication of WLAN.

SUMMARY OF THE INVENTION

According to a first aspect of the invention there is provided a method for controlling authentication of a device within a cellular network, the authentication for allowing the device to access a non-cellular network via an access point, the authentication being between the device and an authenticating entity within the cellular network, the method comprising: obtaining information about a state associated with the device; and evaluating, based on the obtained information, whether to allow the device to perform authentication with the authenticating entity. Preferably, the method is carried out at the device (which is typically a UE of the cellular network). The authentication may be performed via an authenticator. The authenticator may be configured to controls access of the device to the non-cellular network. The access point may act as the authenticator. The authenticating entity may be an authentication server. The authentication may be by (radio) communication between the device and the cellular network and/or non-cellular network.

Thus a management action takes place (preferably at the device) to decide whether the device should connect using the cellular or non-cellular network, for example to access the Internet or specific content. This decision may be taken by a part of an entity (such as the device), which may be termed a "connection manager". This management action may be based on information that the connection manager can obtain from the cellular modem (potentially through the device's operating system) about the device's connectivity and/or usage, especially in terms of its mobility state and/or data activity. Basing the connection decision on state information for the device may be beneficial in allowing the decision to be made in the device's best interest. The connection manager may then make a decision (optionally autonomously, especially when the connection manager is part of the device) to switch between the cellular access technology and the non-cellular access technology. Also, the volume of data required for communication between the device and the network in order for the decision to be reached may advantageously be reduced (thereby reducing the impact on a AAA server of the cellular network). Advantageously, the decision may be achieved without any involvement of the cellular network in influencing the decision. The device may be a UE of the cellular network, advantageously with functionality to access the non-cellular network as well. The connection manager may be a hardware and/or software feature, which interfaces with other parts of the entity, such as the device.

The non-cellular network may be a Wireless Local Area Network (WLAN). The access point may be an access point of the non-cellular network. Alternatively, it could be envisaged that the access point is a cellular network access point provided with the capability of acting as the access point of a non-cellular network (e.g., by way of a non-cellular network module).

The information about a state may be a characteristic, parameter or indicator of the device or of a subscriber associated with the device (the subscriber being of the cellular network and/or non-cellular network). The information about a state associated with the device may relate to a cellular state of the device within the cellular network and/or may be obtained from the cellular network. More than one item of information may be obtained and/or used for evaluation. Thus, multiple items of information about the same state of the device and/or multiple items of information about different states of the device may be used. The states may comprise: cellular mobility; and data activity. Other states may be possible.

The information may comprise information associated with a cellular mobility state of the device and/or information associated with a data activity of the device over the cellular network. The information associated with a data activity of the device may comprise an RRC state and/or a Power Preference Indication (PPI) as defined by 3GPP specifications. The information associated with a cellular mobility state of the device may comprise a 3GPP specified mobility state of the device and/or a number of cell reselections. The number of reselections may be calculated over a defined period of time. The 3GPP specified mobility state and/or the number of cell reselections may be determined by a cellular modem.

The information may be exposed by a cellular modem (e.g. 3GPP modem) of the device to an entity of the device, the entity configured to control the authentication. This may be achieved using the operating system of the device. The cellular modem may use information from a Radio Resource Control (RRC) layer (of the cellular modem, which may include the RRC layer of the link between the device and the cellular network).

The information may be exposed by a cellular layer of the device to the device's operating system. The cellular layer may be the RRC layer.

The evaluating step may further comprise comparing the information with a threshold. The threshold may be preconfigured in the device or provisioned by operator policy.

The device may be camped on the cellular network (i.e. having read the serving cell's system information and continuously measuring the serving cell signal strengths). The device may be performing idle mode mobility procedures as specified in 3GPP specifications. The device may be in connected mode. The device may be performing connected mode mobility procedures in the cellular network as specified in 3GPP specifications.

In certain aspects, the device may have a connection with the cellular network momentarily disabled while attempting to perform authentication with the non-cellular network. In that event, the authentication control may be performed once the device re-connects with the cellular network, and the invention would equally apply to this scenario.

In accordance with a further aspect of the present invention there may be provided an apparatus for controlling authentication of a device within a cellular network, the authentication for allowing the device to access a non-cellular network via an access point, the authentication being between the device and an authenticating entity, the apparatus comprising: means for obtaining information about a state associated with the device; and means for evaluating, based on the obtained information, whether to allow the device to perform authentication with the authenticating entity.

Another aspect of the present invention may provide an apparatus for controlling authentication of a device within a cellular network, the authentication for allowing the device to access a non-cellular network via an access point, the authentication being between the device and an authenticating entity, the apparatus comprising: an input part, configured to obtain information about a state associated with the device; and a processing system configured to evaluate, based on the obtained information, whether to allow the device to perform authentication with the authenticating entity. The apparatus is typically a part of the device, although it may be external to the device (and possibly somehow interfaced with it, by a physical or communications link) in embodiments. The apparatus according to the further aspect and/or this aspect may include further apparatus features that correspond with the method features described herein.

In accordance with a further aspect of the present invention there may be provided a computer program, configured when executed by one or more processors to cause an authentication element of a device within a cellular network to perform any of the above method steps and/or a computer program product comprising memory comprising instructions which when executed by one or more processors cause an authentication element of a device within a cellular network to perform any of the above steps. The computer program may be preloaded or subsequently loaded onto a device and the present invention may provide a device with the computer program loaded (or stored) thereon. The combination of any specific method and/or apparatus features described herein is also provided, even if not explicitly detailed.

BRIEF DESCRIPTION OF THE DRAWINGS

An example of the present invention will now be described in detail with reference to the accompanying drawings, in which.

DETAILED DESCRIPTION

Figure 1:
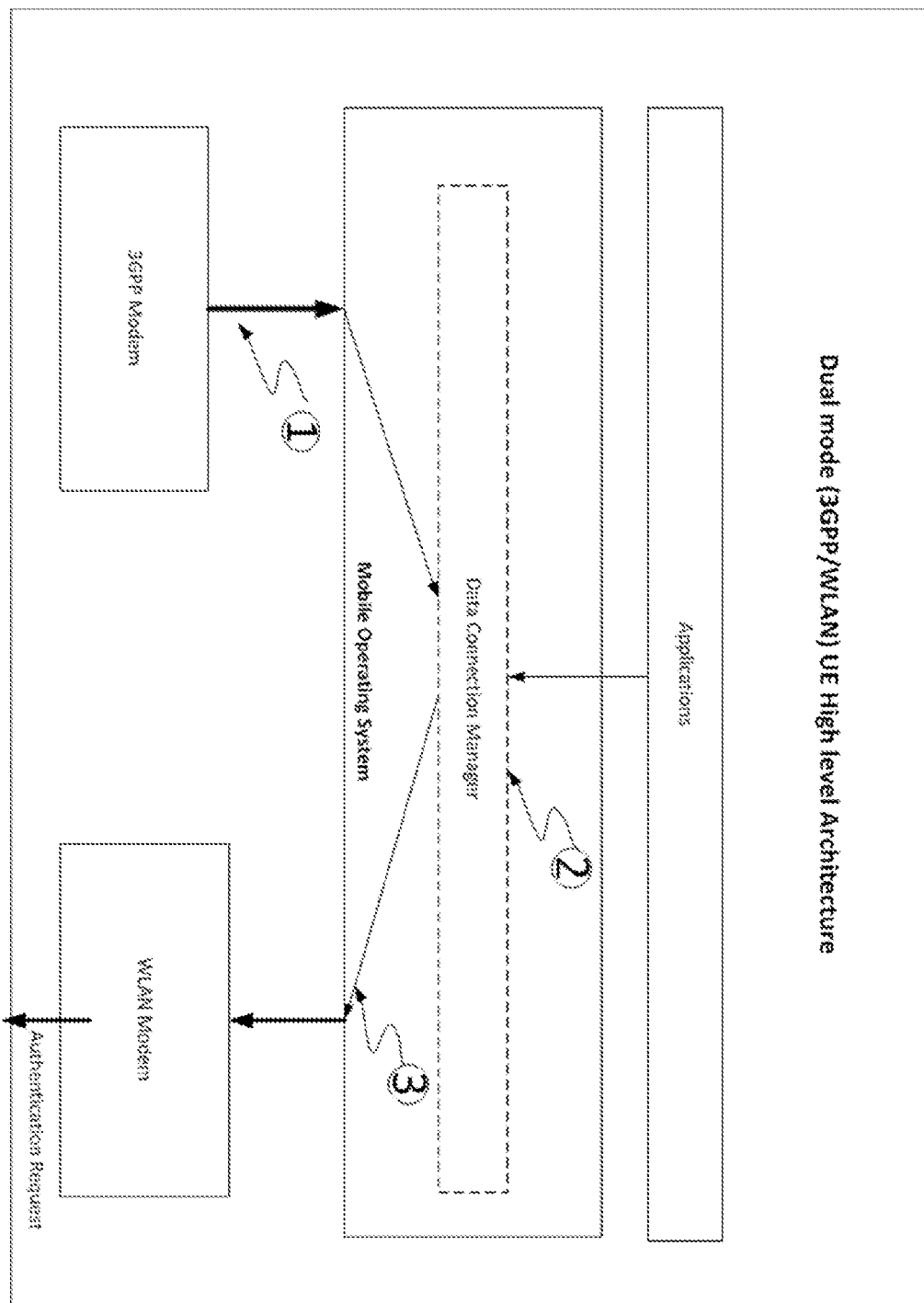
FIG. 1 shows an exemplary architecture and procedure according to an embodiment of the present invention.

The main object of the invention is to control the mobile device behaviour (e.g., a device capable of being connected with a plurality of different networks, for example a cellular network such as GSM, 3G, LTE, and a non-cellular network, such as WLAN) for authentication requests in order to access a non-cellular network by making use of the intelligence on UE mobility and/or data activity that the mobile operating system/connection manager can gather from the device's cellular modem.

The devices that can cause authentication load on the cellular network operator AAA server and subscription databases are typically smartphones with both cellular and WLAN capability. The device may be performing idle mode mobility procedures as specified in 3GPP specifications. The device may be in connected mode. The device may be performing connected mode mobility procedures in the cellular network as specified in 3GPP specifications.

In certain aspects, a device may have a connection with the cellular network momentarily disabled while attempting to perform authentication with the non-cellular network. In that event, the authentication control may be performed once the device re-connects with the cellular network, and the invention would equally apply to this scenario.

While devices are often referred to as "mobile" in the description herein, the term "mobile" should not be construed to require that a device always be mobile, merely that it has the capability of being in communication with a wireless telecommunications network which allows mobility. For instance, a PC terminal or a machine to machine client that is never moved from a particular geographic location may in a sense still be considered mobile as it could be moved to a different location yet still access the same network. Where the term "mobile device" is used in the present discussion it is to be read as including the possibility of a device that is "semi-permanent" or even "fixed" where the context does not contradict such an interpretation.

The information required by the WLAN connection manager to determine whether access on the WLAN is necessary or likely to cause increased authentication signalling might include: the mobility state of the UE or information associated with the mobility state, the data activity of the UE or information related to, the data activity of the UE, the examples described below, or any combination of the above. If we consider the basic principle that a UE aiming to initiate authentication on WLAN is already camping on an overlaying cellular network or connected to the cellular network, the device OS/data connection manager can significantly reduce spurious authentication on WLAN to the cellular AAA server by leveraging information related to the cellular connectivity or information it can get from the cellular network.

Examples of the information required by the WLAN connection manager to determine whether access on the WLAN is necessary or likely to cause increased authentication signalling are described below:

1) UE Mobility State Estimation on Cellular:

UE determines its mobility state by calculating number of cell reselections (in idle mode) and handovers (in connected mode) within a given time period as described in 3GPP TS 36.304. The evaluation period is signalled to the UE in RRC signalling (3GPP TS 36.331). RRC signalling also indicates threshold for the number of cell reselections/handovers within a time period for which the UE should classify the mobility state as 'normal', 'medium' or 'high'. Depending on the configuration, these mobility states might imply different ranges of absolute speed which the operator doing the configuration will be aware of.

The UE uses this information to adjust cell reselection parameters (idle mode) and handover parameters (connected mode) but this mobility state information could equally be useful to evaluate whether authentication on WLAN is sensible. According to the invention, the cellular modem passes one or more of the following information to the operating system or connection manager controlling UE access to WLAN:

The 'mobility state' as evaluated by the 3GPP modem based on network configuration The actual number of cell reselections during the last evaluation period for a mobile device in Idle mode (the configured evaluation period may also be passed or otherwise obtained);

The actual number of handovers during the last evaluation period for a mobile device in connected mode (the configured evaluation period may also be passed or otherwise obtained);

A combination of the above elements.

The connection manager may either use the indicated mobility state (derived by 3GPP modem from operator configuration) or the actual rate of cell reselections (e.g. number reselections/handovers per minute) to evaluate whether UE should be allowed to authenticate on WLAN or not. Alternatively, any of the above information (or other suitable sets of information) could be used by the connection manager to evaluate whether UE should be allowed to authenticate on WLAN or not. Operator policies for WLAN authentication can also be defined either in terms of the mobility state or in terms of cell reselection rate.

By way of example, if it is estimated (based on one or more of the above parameters) that the UE is moving at a speed such that, by the time the UE will be able to operate within the WLAN the UE will be actually not in range of the WLAN anymore, or the signal received by the UE would be insufficient to guarantee a satisfactory connection to the WLAN, then the connection manager may determine that the UE should not be allowed to authenticate on WLAN. This, in turn, will result in avoiding unnecessary signalling for the authentication, thus reducing or minimizing signalling overload.

2) UE RRC State.

The cellular UE can be in different RRC states depending on the traffic activity or inactivity. A UE in 'RRC Connected mode' (as defined in 3GPP TS 25.331 and TS 36.331) means there is a strong probability that this UE has data to send imminently or is already in active data transmission and hence authentication on WLAN is not unnecessary. UE in 'RRC Idle mode' (as defined in 3GPP TS 25.331 and TS 36.331) means that UE is not actively involved in data transfer and automatic association onto WLAN should be postponed until triggered by an application or requested by the user (to reduce signalling). In 3G, there are other sub-states like CELL_PCH and CELL_FACH which are closely related to traffic activity on cellular. Accordingly, these sub-states could be equivalently used for the purpose of this invention.

3) UE Setting of 'Power Preference Indication' (PPI).

PPI (as specified in 3GPP REL-11) is a parameter that tells the network whether the UE can be put in connected mode long DRX. Connection manager knowledge of this setting can also help to determine whether access to WLAN is necessary or meaningful. Setting of the PPI might indicate that this UE is not completely inactive but generate background traffic which occurs every few minutes for example.

FIG. 1 illustrates the principles of UE 3GPP modem forwarding relevant information to the Operating System (OS) which can be used by the connection manager embedded in the OS or exposed by Application Programme Interfaces (APIs) to the application layer for a client to control access to WLAN.

In step 1, 3GPP modem exposes information on Radio Resource Control (RRC) state, Power preference Indication setting (LTE only), UE mobility state, number of cell reselections/handovers per unit time. In step 2, Data Connection Manager in UE gets information on RRC state, PPI (LTE only), UE mobility state or number of cell reselections/handovers per unit time and use the cellular intelligence to make decisions on whether or not to perform automatic WLAN access (in absence of an explicit request from an application or user to perform WLAN access). In step 3, Data connection manager prevents or allow WLAN authentication requests to be generated based on outcome of the algorithm decision.

An example of an algorithm is described below which the connection manager may use to prevent unnecessary authentication on WLAN in the following paragraphs.

The operator may define thresholds (policies) to control the algorithm or the thresholds may be implementation specific. Examples of operator defined thresholds or implementation specific thresholds might be the following:

Do not authenticate on WLAN if UE RRC state is not 'RRC Connected state' as indicated by 3GPP modem.

Do not authenticate on WLAN if the Power preference indication is set to 'TRUE' (this might imply that operator wants UE to stay on cellular for background type traffic)

Do not authenticate if UE mobility state is evaluated as 'High' OR Do not authenticate if Number of cell reselections/handovers per minute>x As a default behaviour, UE connection manager may also assess whether there are any requests pending from the application layers to send data on WLAN.

Figure 2:
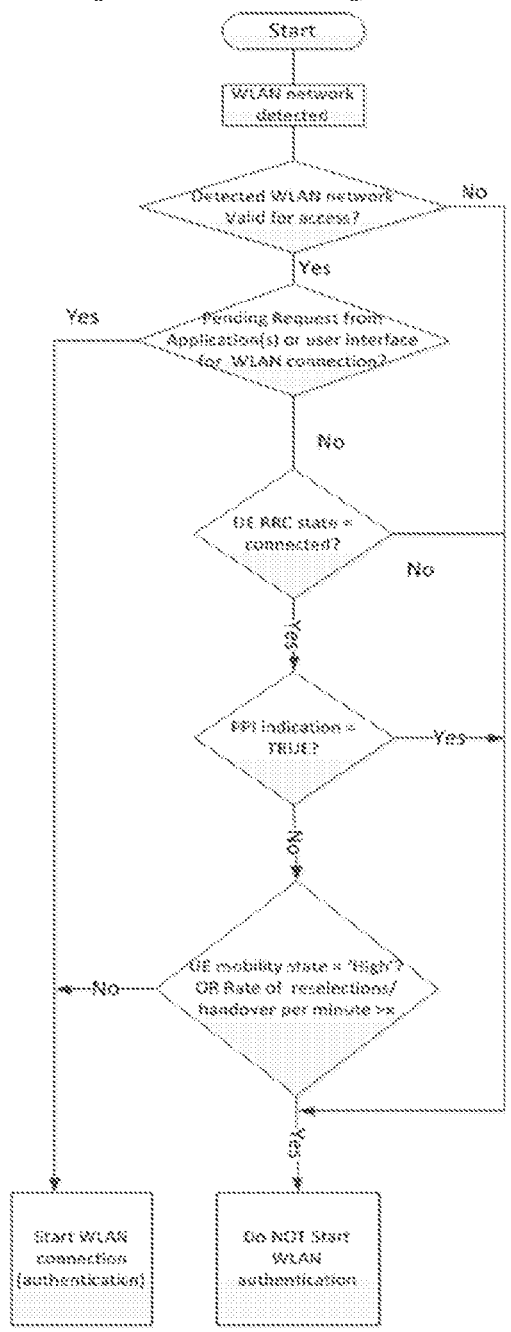
FIG. 2 is a flow diagram depicting an exemplary process according to an embodiment of the present invention.

An exemplary algorithm using the information exposed by 3GPP modem is given in FIG. 2 and described below.

The WLAN modem is scanning for WLAN networks and evaluating whether a detected WLAN network is valid for access e.g. using WFA hotspot 2.0 capabilities. When a valid WLAN network is detected, the algorithm will assess if there are any pending requests from applications to access WLAN or a request from the user via the user interface to access WLAN perform WLAN authentication if such requests are pending.

However, if no pending requests for WLAN access exist, the algorithm uses cellular network intelligence to further determine whether WLAN authentication is necessary on the detected WLAN AP.

If the UE state is 'RRC Connected', and the UE preconfigured policy or operator defined policy requires that UE authenticates on WLAN only if it is in 'RRC Connected' state, then the algorithm proceeds to check other information. Otherwise, UE does not authenticate on WLAN (for example if UE is in 'RRC Idle' state).

For a UE in 'RRC Connected' state, the algorithm may optionally proceed to obtain information about a 'Power preference indication' (PPI) setting. This information may be available when the 3GPP modem supports LTE Release 11. The algorithm will check preconfigured policy or operator provisioned policy to determine whether WLAN authentication is required for a device with PPI indication set to true. An operator's policy could be for the device to stay on cellular when the PPI indication is true (which might imply that the UE intermittently generates small packets of data e.g. keep alive signals) as the cellular network will not benefit from offloading of small amount of traffic on the WLAN and this will cause signalling load.

If the algorithm determines that UE is in 'RRC Connected' and optionally, that policy based on available Power Preference Indication (PPI) information does not prevent the UE from performing WLAN access, it may proceed with checking the UE mobility conditions to further determine if WLAN authentication access is advisable or not (depending on preconfigured policy or operator provisioned policy for example). The algorithm determines the mobility conditions of the UE using intelligence from the 3GPP cellular modem which is accessible via the operating system. The mobility condition information may take the form of the 'mobility state' as evaluated by 3GPP modem or the 'number of cell reselections/handovers per unit time as evaluated by 3GPP modem. For example, if the UE policy (preconfigured or provisioned by the operator) indicates that UE should not authenticate on WLAN access if its 3GPP mobility state is 'high', the algorithm considers the '3GPP mobility state' information for the decision. If the UE policy indicates that UE should not authenticate on WLAN access if the number of cell reselections or handovers per minute is greater than a defined threshold, algorithm considers the related information from 3GPP modem for WLAN authentication access decision.

In the absence of explicit requests for WLAN access from the application layer or user, the algorithm limits authentication access on WLAN only to cases where there is cellular data activity and/or UE will not stay on the WLAN access for brief period (too short for meaningful communication to occur).

A further description of the present invention is also described in the following paragraphs, which are an extract from GSMA and WBA Wi-Fi Roaming Task Force draft whitepaper on signalling optimisation.

Using Cellular Network Intelligence to Control WLAN Authentication Load.

The dual mode UE will most of the time (if not always) be camping on the cellular network i.e. it is synchronised with the cellular network, can read the system information, receive paging information and initiate calls on the cellular network. Moreover, UE can also initiate data connections on the cellular network when requested by applications.

The 3GPP have already well established procedures for saving the UE battery power based on the UE traffic activity/inactivity conditions typically monitored in the network and also procedures for determining whether UE needs to have certain signalling connections to the radio network, depending on its traffic activity. 3GPP have defined the Radio Resource Control (RRC) states whereby an inactive UE is typically put in 'RRC Idle' state (no radio signalling connection) and an active UE is put in an 'RRC connected' state (with a radio signalling connection). For 3GPP UMTS, other sub-states are defined such as CELL_PCH/URA_PCH/CELL_FACH which are all related to the network assessment of the UE traffic activity.

If the 3GPP modem can expose the RRC state of the UE on the cellular network to the data connection manager, this already gives a good indication on whether the UE is actively transmitting/receiving data or expecting to have some traffic activity imminently. The data connection manager should use this intelligence of the UE RRC state (whenever available) from the cellular network (which may be complimentary to information about applications having pending connection requests) to determine whether it is necessary for the UE to connect to a detected WLAN.

Recommendation X1: 3GPP modem should expose the cellular RRC state of the UE to the Data Connection manager via the operating system Application Program Interfaces (APIs).

In 3GPP Release 11, a 'power preference indication' flag from the UE to the network has been specified for LTE which gives an indication to the network that the UE has ongoing background type traffic (e.g. keep alive signals every few minutes) which the network can use to configure longer discontinuous reception modes (long DRX) for UEs in connected mode. If such a flag is exposed by the 3GPP modem to the upper layers (data connection manager), it will be an effective way for the Data connection manager to obtain information on the data activity state (without having to duplicate the functionality to gather this information) which can be used to prevent or allow WLAN authentication e.g. depending on operator policy.

Recommendation X2: 3GPP LTE Modem should expose 'power preference indication' flag to Data connection manager via the operating system APIs.

Besides data activity, another key factor than can affect UE decision on whether it should connect to WLAN or not is the UE mobility state. The decision can be guided by operator policy as described in the previous section.

Even though UE implementations might have proprietary means to evaluate the UE speed, the cellular network already has crude way (but perhaps effective way for the problem at hand) to evaluate the UE mobility state in both 'RRC Idle mode' and 'RRC Connected mode'. When UE is in 'RRC idle' state, it counts the number of times it reselects cells within a specified period when it is in 'RRC connected state' it counts the number of handovers within a specified period instead.

The operator, in addition, configures the thresholds for 'number of cell reselections/handovers in a specified time period' for UE to class the mobility state as 'normal', 'medium' or 'high'. The 3GPP modem uses the mobility state to adjust cell reselection parameters and handover parameters which improves the UE performance under different mobility conditions.

As a baseline for the data connection manager should evaluate the 'mobility state' of the UE by using either the 'mobility state' evaluation done by the 3GPP modem or the information on cell reselection rate/handover rate to determine the UE mobility conditions and decide whether or not to do WLAN authentication. The decision can be guided by operator policies regarding WLAN authentication based on UE mobility conditions.

Recommendation X3: The 3GPP modem should expose information on the 'UE mobility state', cell reselection rate (e.g. number of cell reselections per minute) and/or handover rate (e.g. number of handovers per minutes) to the data connection manager via the operating system APIs.

Recommendation X4: The data connection manager should consider, as a baseline, cellular intelligence from the 3GPP modem when making decisions e.g. based on operator defined policies on initiating automatic WLAN access:

1) UE 3GPP RRC state
2) UE setting of 'power preference indication' when available (3GPP LTE UE only)
3) UE 3GPP mobility state information (mobility state and/or number of cell reselections/handovers per unit time.

As a final remark, all the technical specifications, standards and/or protocols cited throughout this specification either by way of explicit mentioning (e.g., 3GPP TS xx.xxx, 802.1x, etc.) or by implicit mentioning (e.g., "as defined/specified by 3GPP specifications") are hereby incorporated by reference in their entirety.

The invention claimed is:

1. A method for controlling authentication of a device within a cellular network, the authentication for allowing the device to access a non-cellular network via an access point, the method comprising:
obtaining information about a state associated with the device that is determined over a defined period of time and comprises at least one of information associated with a cellular mobility state of the device and information associated with a data activity of the device over the cellular network; and
evaluating, based on the obtained information, whether to allow the device to perform authentication with an authenticating entity that is within the cellular network.

2. The method of claim 1, wherein the method is carried out at the device.

3. The method of claim 1, wherein the non-cellular network is a Wireless Local Area Network (WLAN) and/or the access point is an access point of the non-cellular network.

4. The method of claim 1, wherein the information is obtained from the cellular network.

5. The method of claim 1, wherein the information is exposed by a cellular modem of the device to an entity of the device, the entity configured to control whether to allow the device to perform the authentication with the authenticating entity that is within the cellular network.

6. The method of claim 5, wherein the cellular modem uses information from a Radio Resource Control (RRC) layer of the cellular modem.

7. The method of claim 1, wherein the information associated with a data activity of the device comprises an RRC state and/or a Power Preference Indication (PPI).

8. The method of claim 1, wherein the information associated with a cellular mobility state of the device comprises a 3GPP specified mobility state of the device and/or a number of cell reselections.

9. The method of claim 8, wherein the number of reselections is calculated over the defined period of time and/or one or both of the 3GPP specified mobility state and the number of cell reselections are determined by a cellular modem.

10. The method of claim 1, wherein the evaluating step further comprises: comparing the information with a threshold.

11. The method of claim 1, wherein the device is performing idle mode mobility procedures or performing connected mode mobility procedures in the cellular network.

12. The method of claim 1, wherein a connection between the device and the cellular network is momentarily disabled while the device is attempting to perform authentication to access the non-cellular network.

13. An apparatus for controlling authentication of a device within a cellular network, the authentication for allowing the device to access a non-cellular network via an access point, the apparatus comprising:
an interface configured to obtain information about a state associated with the device that is determined over a defined period of time and comprises at least one of information associated with a cellular mobility state of the device and information associated with a data activity of the device over the cellular network; and
a processing system, configured to evaluate, based on the obtained information, whether to allow the device to perform authentication with an authenticating entity that is within the cellular network.

14. A non-transitory computer-readable storage medium comprising computer-executable program instructions stored thereon which, when executed by one or more processors, are configured to cause an authentication element of a device within a cellular network to perform the method steps of claim 1.

* * * * *